(12) United States Patent
Flashaar et al.

(10) Patent No.: US 10,189,569 B2
(45) Date of Patent: Jan. 29, 2019

(54) DRAINING DEVICE FOR DRAINING A FLUID LINE

(71) Applicant: Airbus Operations GmbH, Hamburg (DE)

(72) Inventors: Sebastian Flashaar, Hamburg (DE); Matthias Reiss, Hamburg (DE); Michael Rempe, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/959,171

(22) Filed: Dec. 4, 2015

(65) Prior Publication Data
US 2016/0167787 A1 Jun. 16, 2016

(30) Foreign Application Priority Data

Dec. 10, 2014 (DE) .......................... 10 2014 118 285

(51) Int. Cl.
*B64D 11/04* (2006.01)
*B64D 11/00* (2006.01)
(Continued)

(52) U.S. Cl.
CPC .............. *B64D 11/04* (2013.01); *B64D 11/00* (2013.01); *B67D 1/00* (2013.01); *F16L 55/00* (2013.01); *E03B 7/08* (2013.01); *F16L 55/07* (2013.01)

(58) Field of Classification Search
CPC ..... B64D 11/04; B64D 11/0007; B64D 11/00; F16L 55/00; F16L 55/07; E03B 7/08;
(Continued)

(56) References Cited

U.S. PATENT DOCUMENTS 4,521,038 A * 6/1985 Cerny .................. A61M 16/08
128/202.27
5,083,727 A 1/1992 Pompei et al.
(Continued)

FOREIGN PATENT DOCUMENTS

DE 102008064119 A1 7/2010
DE 102010053982 A1 6/2012
(Continued)

OTHER PUBLICATIONS

The People's Republic of China, Chinese Office Action for Chinese Patent Application No. 201510896622.1 dated May 4, 2017.
(Continued)

*Primary Examiner* — Michael R Reid
(74) *Attorney, Agent, or Firm* — Lorenz & Kopf LLP

(57) ABSTRACT

A draining device for draining a fluid line is provided. The draining device comprises a mechanically non-locking coupling and a holding device. The mechanically non-locking coupling is configured to establish a fluid conductive connection with the fluid line. The holding device is configured to stationary fix the mechanically non-locking coupling relatively to the fluid line. The draining device allows establishing a fluid conductive connection between the fluid line and the mechanically non-locking coupling without requiring a mechanical fixation directly at the mechanically non-locking coupling.

9 Claims, 2 Drawing Sheets

(51) Int. Cl.
  *F16L 55/00* (2006.01)
  *B67D 1/00* (2006.01)
  *F16L 55/07* (2006.01)
  *E03B 7/08* (2006.01)
(58) Field of Classification Search
  CPC ......... Y10T 137/5109; Y10T 137/5283; Y10T 137/6086; Y10T 137/6116; Y10T 137/9029; Y10T 137/6028–137/6082; Y10T 137/6906
  USPC ............. 137/269, 271, 315.33, 316, 137/315.16–315.32, 798, 899.2; 244/118.5
  See application file for complete search history.

(56) References Cited

U.S. PATENT DOCUMENTS

| | | | | |
|---|---|---|---|---|
| 5,197,515 | A | | 3/1993 | Saville et al. |
| 5,511,573 | A | * | 4/1996 | Corte ..................... F16K 27/12 137/15.08 |
| 6,101,766 | A | * | 8/2000 | Mogensen .............. B60R 15/00 105/238.1 |
| 6,148,858 | A | * | 11/2000 | Kirkman ............... E21B 33/038 137/614.02 |
| 2005/0081929 | A1 | * | 4/2005 | Tiberghien .......... F16L 37/0841 137/614.05 |
| 2008/0224078 | A1 | * | 9/2008 | Hecht ................... F16K 27/003 251/129.15 |
| 2010/0243800 | A1 | | 9/2010 | Koschberg et al. |
| 2012/0217343 | A1 | | 8/2012 | Koschberg et al. |
| 2013/0299011 | A1 | | 11/2013 | Maier-Witt et al. |
| 2014/0102553 | A1 | | 4/2014 | Burd |

FOREIGN PATENT DOCUMENTS

| | | |
|---|---|---|
| EP | 0357576 A2 | 3/1990 |
| EP | 2299157 A1 | 3/2011 |
| EP | 2695812 A1 | 2/2014 |
| WO | 2010142420 A1 | 12/2010 |

OTHER PUBLICATIONS

European Patent Office, European Extended Search Report for European Patent Application No. 15195990.5 dated Apr. 29, 2016.
German Patent Office, German Search Report for German Patent Application No. 10 2014 118 285.5 dated Aug. 28, 2015.
European Patent Office, Office Action for European Application No. 15195990.5 dated Jun. 19, 2018, 4 pp.

* cited by examiner

DRAINING DEVICE FOR DRAINING A FLUID LINE

CROSS-REFERENCE TO RELATED APPLICATION

This application claims priority to German Patent Application No. 10 2014 118 285.5, filed Dec. 10, 2014, which is incorporated herein by reference in its entirety.

TECHNICAL FIELD

This relates to a draining device for draining a fluid line and to a galley unit for a means of transportation having such a draining device.

BACKGROUND

In addition, other objects, desirable features and characteristics will become apparent from the subsequent summary and detailed description, and the appended claims, taken in conjunction with the accompanying drawings and this background.

Galley units are typically used in means of transportation, in particular, in means of transportation for the transport of passengers such as, e.g., in aircraft in order to prepare and process meals and beverages. A galley unit comprises several different appliances, at least some of which are supplied with water via a water line. Appliances of this type are generally referred to as water consumers and may comptidr a beverage dispenser or a coffee machine.

A water consumer is coupled to the galley unit via a fluid line. In this case, the galley unit also comprises a line system in order to supply water, for example. The line system of the galley unit may require periodic servicing and/or maintenance. In this case, the line system is flushed with a cleaning or rinsing fluid by conducting the cleaning or rinsing fluid through the line system. This process can be referred to as draining. The line system of the galley unit can be drained or flushed. The explanations in this description apply in an analogue manner to both operating states.

The line system may comprise line sections or line branches, to which the water consumers are connected. In this case, such a line section may comprise a self-closing coupling on one end. In this way, an outlet of the line section is automatically closed when the water consumer is decoupled from the line section. This self-closing feature or characteristic of the line section prevents water from escaping from the line section when the consumer is decoupled. When the line system of the galley unit is drained, the water consumers are usually decoupled and a valve at the outlet of the line sections of the galley unit is closed. Line sections with a self-closing coupling on their outlet potentially cannot be subjected to a flow of rinsing fluid during the draining process because the rinsing fluid is merely introduced into these line sections, but is unable to flow through. Consequently, rinsing fluid can accumulate in such line sections and be subsequently withdrawn or taken by the water consumers when they are connected to these line sections. This may be undesirable because the water consumers in this case also use the rinsing fluid accumulated in the line section, e.g., for the preparation of beverages. In this case, it would be necessary, e.g., to dispose of a certain number of prepared beverages or to initially withdraw a certain quantity of water immediately after the drainage of the line system before additional water in the form of potable water is withdrawn by the water consumer.

DE 10 2008 064 119 A1 and US 2010/0243800 A1 describe a galley for an aircraft with several functionally different appliances.

SUMMARY

Thus, there is provided a draining device for a fluid line that makes it possible to carry out a draining process more efficiently.

According to an aspect, a draining device for draining a fluid line is disclosed. The draining device comprises a mechanically non-locking coupling and a holding device. The mechanically non-locking coupling is designed for producing a fluid-conductive connection with the fluid line. The holding device is designed for holding the mechanically non-locking coupling stationary relative to the fluid line.

The fluid line, with which the mechanically non-locking coupling produces a fluid-conductive connection, comprises a line section of a line system of a galley unit, to which a water consumer can be connected. The fluid-conductive connection between the water consumer and the fluid line may be realized, in particular, in the form of a double self-closing connection. In other words, the fluid line of the water consumer as well as the fluid line of the galley unit is closed when the water consumer is decoupled or detached from the fluid line such that water can neither escape from the water consumer, nor from the fluid line of the galley unit.

The draining device is designed to be coupled to the fluid line of the galley unit like a presently described water consumer such that the rinsing fluid also flows through the line section, which is closed on one end after the water consumer has been decoupled, when the line system of the galley unit is drained.

The draining device is connected to the fluid line, in particular, without thereby producing a direct mechanical fixation between the fluid line and the coupling of the draining device. This means, for example, that the coupling of the draining device and the fluid line can be pressed on one another or against one another or held in a corresponding position. However, when the draining device is removed from the fluid line, i.e. moved in a direction away from the fluid line, the mechanically non-locking coupling can be detached from the fluid line without resistance.

This makes it possible, in particular, to utilize such a draining device for draining a fluid line that is difficult to access, e.g. because the fluid line is arranged on a rear wall of a galley unit or only accessible through a long and narrow shaft and a mechanical separation of the draining device from the fluid line would therefore be quite complicated.

However, in order to hold the draining device in a position such that it is not pushed off by the pressure of the rinsing fluid and no rinsing fluid can escape from the fluid line, the draining device is held in position by the holding device. The preceding reference to the holding device being designed for holding the mechanically non-locking coupling stationary relative to the fluid line means that the mechanically non-locking coupling is immovably or stationarily held, particularly in such a way that no relative motion between the mechanically non-locking coupling and the fluid line takes place.

A fluid-conductive connection between the mechanically non-locking coupling and the fluid line means that a fluid can flow between these two components. In the case of a double self-closing coupling, this can take place when the mechanically non-locking coupling of the draining device is pressed on the fluid line such that both couplings are opened and allow a fluid flow.

Due to the spatial and functional separation of the fluid-conductive connection and the mechanical fixation, a draining device of the type described above and below can also be used for draining fluid lines that are difficult to access.

According to an embodiment, the holding device is designed for connecting the mechanically non-locking coupling to the fluid line in a fluid-tight manner.

This means that the holding device is designed for exerting such a high force upon the mechanically non-locking coupling and, for example, for pressing this coupling on the fluid line so firmly that no rinsing fluid or essentially no rinsing fluid flowing into the draining device through the fluid line escapes at this junction.

According to a further embodiment, the draining device furthermore comprises a drainage line. In this case, the mechanically non-locking coupling is arranged on one end of the drainage line and the holding device is coupled to the drainage line.

The drainage line allows the discharge of the rinsing fluid during the drainage of the line system. The holding device may be arranged in such a way that it indirectly exerts a force upon the mechanically non-locking coupling via the drainage line in order to hold the mechanically non-locking coupling in a desired position. However, the holding device may also be designed in such a way that the mechanically non-locking coupling is arranged on the holding device.

According to a further embodiment, the holding device is offset relative to the mechanically non-locking coupling in the longitudinal direction of the drainage line.

The drainage line may be at least sectionally made of a rigid material such that the holding device can exert a force upon the mechanically non-locking coupling via this section of the drainage line. In this way, the draining device is also suitable for use on fluid lines that are difficult to access and that are spaced apart from a front surface of the galley unit by considerable distance. Due to the offset in the longitudinal direction, the mechanically rigid section of the drainage line acts like an extension for producing a fluid-conductive connection between the mechanically non-locking coupling and the fluid line.

According to a further embodiment, the holding device comprises a locking element, wherein the locking element is designed for fixing the holding device in such a way that the holding device holds the mechanically non-locking coupling stationary relative to the fluid line.

The locking element may be arranged, in particular, spatially separated from the mechanically non-locking coupling. The locking element may particularly be arranged in such a way that the draining device can be removed from a position, in which it is connected to the fluid line, by releasing the locking element without requiring access to the fluid line and to the mechanically non-locking coupling, i.e. without the mechanically non-locking coupling having to be directly detached from the fluid line, e.g., by the operating personnel.

According to a further embodiment, the locking element is designed for producing a reversible connection with a mount.

In this case, the mount may form part of the galley unit and the locking element fixes the draining device relative to the galley unit. The locking element may be designed for producing a non-positive (force-locked) or positive connection with the mount, wherein this connection can be separated as required. The reversible connection may particularly consist of a separable clamping connection or of a connection produced by means of a pin. The locking element is designed, in particular, for preventing a motion of the draining device in a direction away from the fluid line.

According to a further embodiment, the draining device furthermore comprises a valve, wherein the valve is arranged in the drainage line and designed for allowing the discharge of a fluid through the drainage line.

In this way, a discharge of the rinsing fluid is controlled by means of the valve in the drainage line. The draining device is typically coupled to the fluid line and the valve is subsequently opened in order to allow the discharge of the rinsing fluid from the connected line branch of the galley unit.

According to a further embodiment, the drainage line is at least sectionally realized in the form of a flexible hose.

In this way, the drainage line can be routed into a water outlet while a line system of a galley unit is drained in order to thereby discharge the rinsing fluid. A flexible hose can be bent in accordance with the respective spatial requirements in order to deliver the rinsing fluid being discharged to a water outlet such as, for example, a sink.

According to a further aspect, a galley unit for a means of transportation is provided. The galley unit comprises a water supply and a draining device of the type described above and below. The water supply comprises a supply line and a first fluid branch, wherein the first fluid branch is designed for being coupled to a consumer. The mechanically non-locking coupling is coupled to the first fluid branch in a fluid-conductive manner such that a fluid can be discharged from the first fluid branch.

When the consumer is decoupled from the first fluid branch, a self-closing coupling typically closes the first fluid branch in a fluid-tight manner. Consequently, no fluid flow takes place through the first fluid branch during the drainage of the line system of the galley unit and rinsing fluid can remain at this location after the draining process. The draining device described herein also makes it possible to easily drain fluid branches in the galley unit which are difficult to access and to ensure that no residues of rinsing fluid remain in the first fluid branch.

For example, the means of transportation may consist of an aircraft, particularly a passenger aircraft.

According to an embodiment, the galley unit furthermore comprises a mount, wherein the holding device is mechanically coupled to the mount such that the mechanically non-locking coupling is held stationary relative to the first fluid branch.

The mount may consist of a rail arrangement that is designed for receiving and fixing a kitchen appliance in a working position such that the kitchen appliance is positioned and fixed relative to a water connection. In order to release the kitchen appliance from its position, the water connection may be realized in a mechanically non-locking manner because the fluid line may be arranged on the rear wall of the galley unit due to the limited structural space available in an aircraft and therefore be inaccessible to the operating personnel in the installed state of the kitchen appliance. Consequently, the operating personnel cannot mechanically separate or release a thusly arranged water connection. In fact, mechanically non-locking couplings are used in such instances, wherein these couplings separate or release when the kitchen appliance is removed from an installed operational position.

Particularly, such a design of the galley unit can complicate the connection of a draining device to the fluid line because the draining device also has to be realized in a non-locking manner for structural reasons in order to remove the draining device from its draining position. Due to the spatial separation of the fluid-conductive connection and the mechanical fixation by means of the holding device, it is possible to use the draining device with little effort and to improve the drainage of the galley unit.

According to a further embodiment, the locking element is coupled to the mount in a mechanically reversible manner.

As already described above, this makes it possible to separate the fluid-conductive connection between the draining device and the galley unit without having to separate a mechanical connection at the fluid line, but rather by separating the easily and well accessible mechanical connection between the holding device and the mount.

According to a further embodiment, the galley unit comprises a control unit, wherein the control unit is designed for transferring or putting the first fluid branch into a fluid-conductive state.

In this way, draining of the galley unit can take place automatically. The control unit may transfer or put an outlet valve of the first fluid branch into an open state such that the rinsing fluid can flow out of the first fluid branch and into the draining device. The control unit may also be designed for respectively controlling or causing the supply of rinsing fluid into the line system of the galley unit. It would likewise be conceivable that the valve in the drainage line is actuated by the control unit. In this case, a signaling connection between the control unit and the draining device is produced and an actuator opens and closes the valve in the drainage line.

According to a further embodiment, the control unit is designed for transferring the valve in the drainage line into a fluid-conductive state.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
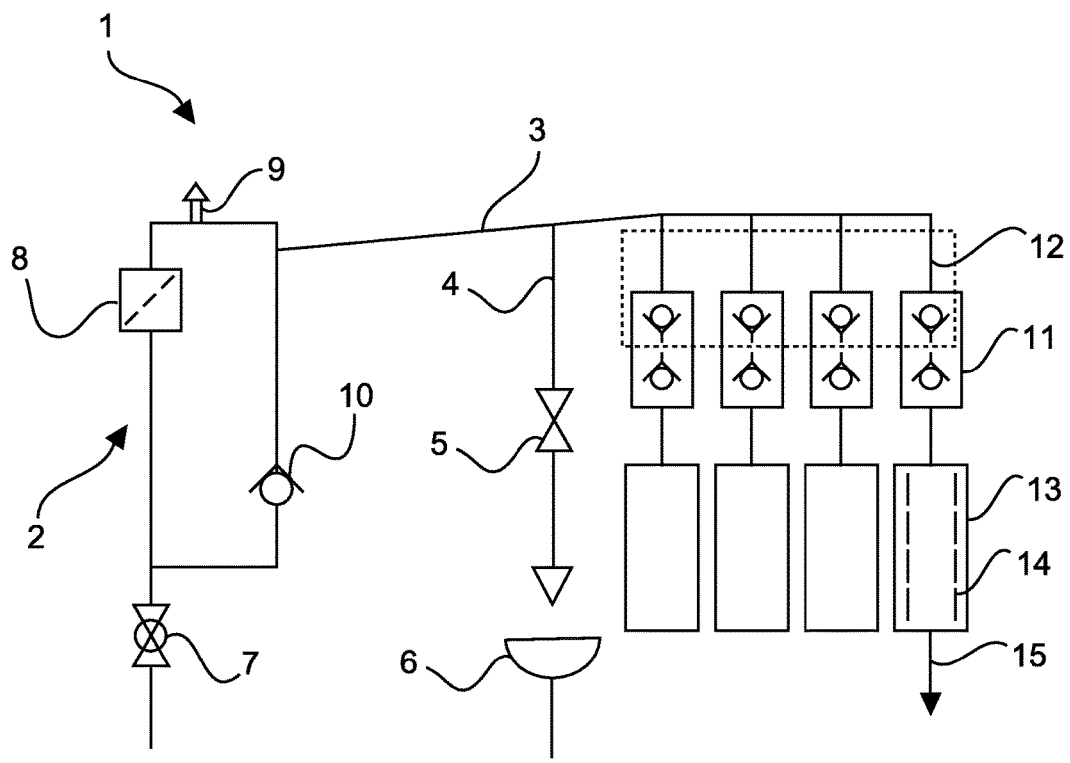
FIG. 1 shows a schematic representation of a galley unit.

FIG. 1 shows a galley unit 1 with a line system that is used as a water supply 2. The water supply 2 comprises a valve 7 that is designed for controlling the inflow of water to the water supply 2. The water supply 2 furthermore comprises a fluid filter 8, a ventilation unit 9, and a check valve 10. A supply line 3 extends from the water supply to the water-consuming appliances 14. Several branches 12 (four of which are illustrated in FIG. 1) respectively extend from the supply line 3 to a water consumer 13 or kitchen appliance. On their rear side, the kitchen appliances are respectively connected to a fluid branch in a fluid-conductive manner by means of a double self-closing coupling 12. The kitchen appliances can be removed from the galley unit in the direction of the arrow 15. During a motion in the direction of the arrow 15, the double self-closing coupling 12 separates or releases because it is realized in the form of a mechanically non-locking coupling. This may be particularly important because the rear space of the kitchen appliances is inaccessible to the operating personnel such that it would be complicated or even impossible to release a mechanical lock.

Each kitchen appliance 13 may be coupled to the galley unit by means of a mount 14 in the form of mounting rails. In the installed state, the kitchen appliances 13 may be mechanically coupled to the mount 14 in order to hold the kitchen appliances stationary relative to the respective fluid branch assigned thereto.

The supply line 3 may also comprise a discharge line 4 with an outlet valve 5. It may consist of a water withdrawal unit such as, e.g., a water tap assigned to a wastewater receptacle unit 6 in the form of a sink.

When the line system of the galley unit with the lines 3 and 12 is drained, it can occur that rinsing fluid accumulates, particularly in the fluid branches 12, and is not discharged because the fluid branches 12 are angled relative to the supply line 3. In an aircraft, the fluid branches 12 may extend vertically, i.e. a weight may retain the rinsing fluid in the fluid branches 12 and prevent the discharge thereof. In this case, the rinsing fluid can only flow out of the fluid branches 12 when the double self-closing coupling 11 is opened, e.g. when a kitchen appliance is connected.

The draining device of the presently described type specifically prevents such instances and makes it possible to the rinsing fluid to discharge from the fluid branches 12 during the draining process. Although the fluid branches 12 are difficult to access or not accessible at all to the operating personnel, the draining device is pushed into a kitchen appliance shaft of the galley unit and produces a fluid-conductive connection with the first fluid branch 12. In order to remove the draining device, it suffices to release the locking element from the mount 14 such that the operating personnel is not dependent on having access to the fluid branch 12 on the rear wall of the galley unit.

Figure 2:
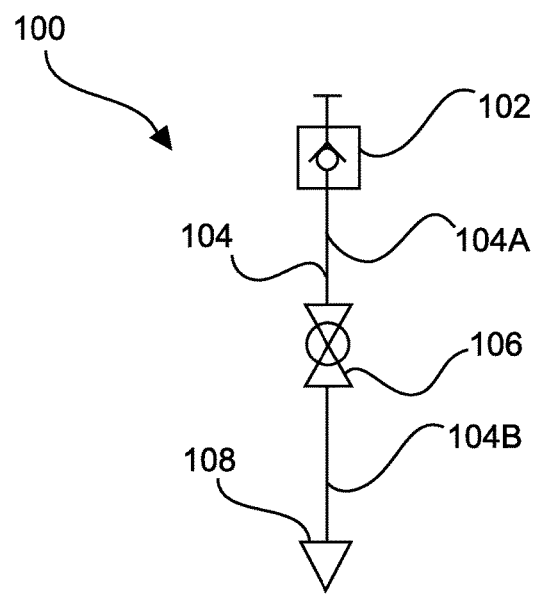
FIG. 2 shows a schematic representation of a draining device.

FIG. 2 schematically shows a draining device 100 with its functional elements. A self-closing coupling 102 on one end of the first fluid line section 104A of the fluid line 104 functionally corresponds to one part of the double self-closing coupling 11, namely the part on the appliance side in FIG. 1. A valve 106 is arranged in the fluid line 104 in order to discharge the rinsing fluid. The rinsing fluid is discharged through an outlet 108 on a second end of the fluid line 104.

Figure 3:
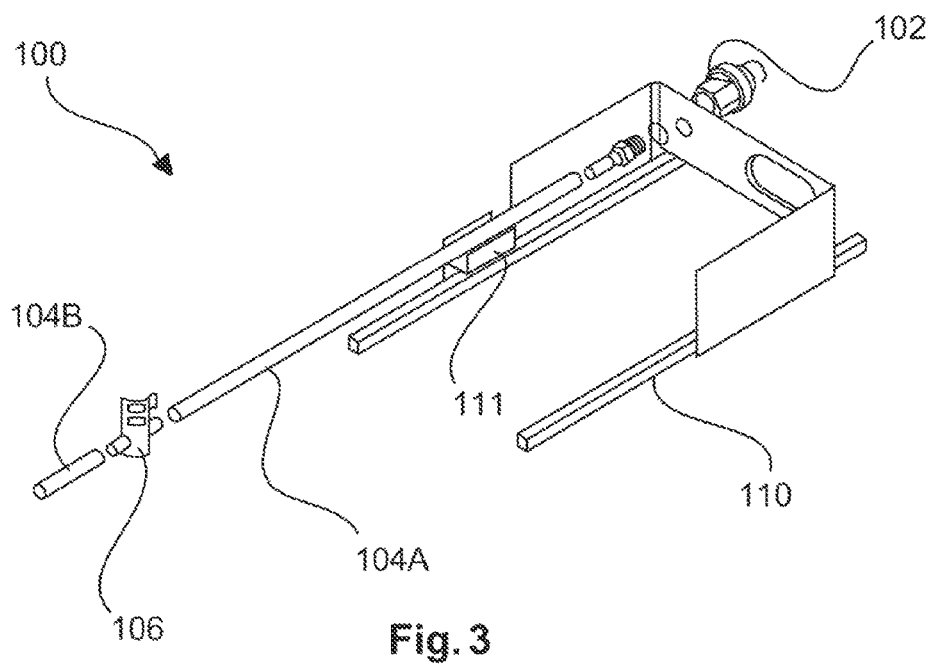
FIG. 3 shows a schematic isometric representation of a draining device.

FIG. 3 shows an example of a draining device 100 in the form of an exploded view. This figure shows the self-closing coupling 102, the first fluid line section 104A, the valve 106 and a second fluid line section 104B, which are also illustrated in FIG. 2. These elements represent those fluid-conductive elements that, in particular, are not mechanically locked to the first fluid branch 12 of the galley unit.

A holding device 110 with a locking element 111 is coupled to the drainage line 104, e.g. directly behind the self-closing coupling 102, and designed for being mechanically coupled to the mount 14 of the galley unit. The locking element 111 is offset relative to the self-closing coupling 102 in the longitudinal direction of the drainage line 104 such that the locking element 111 is located closer to the front surface of the galley unit and therefore easier to access for the operating personnel in an installed state in the galley unit. In this way, the fluid-conductive connection between the self-closing coupling 102 and the first fluid branch can be separated by releasing the locking element 111 from the mount 14 and pulling the draining device from the kitchen appliance shaft. The holding device 110 may comprise guide rails or holding rails that are designed for engaging with the mount 14 and thereby fixing the draining device relative to the mount.

Figure 4:
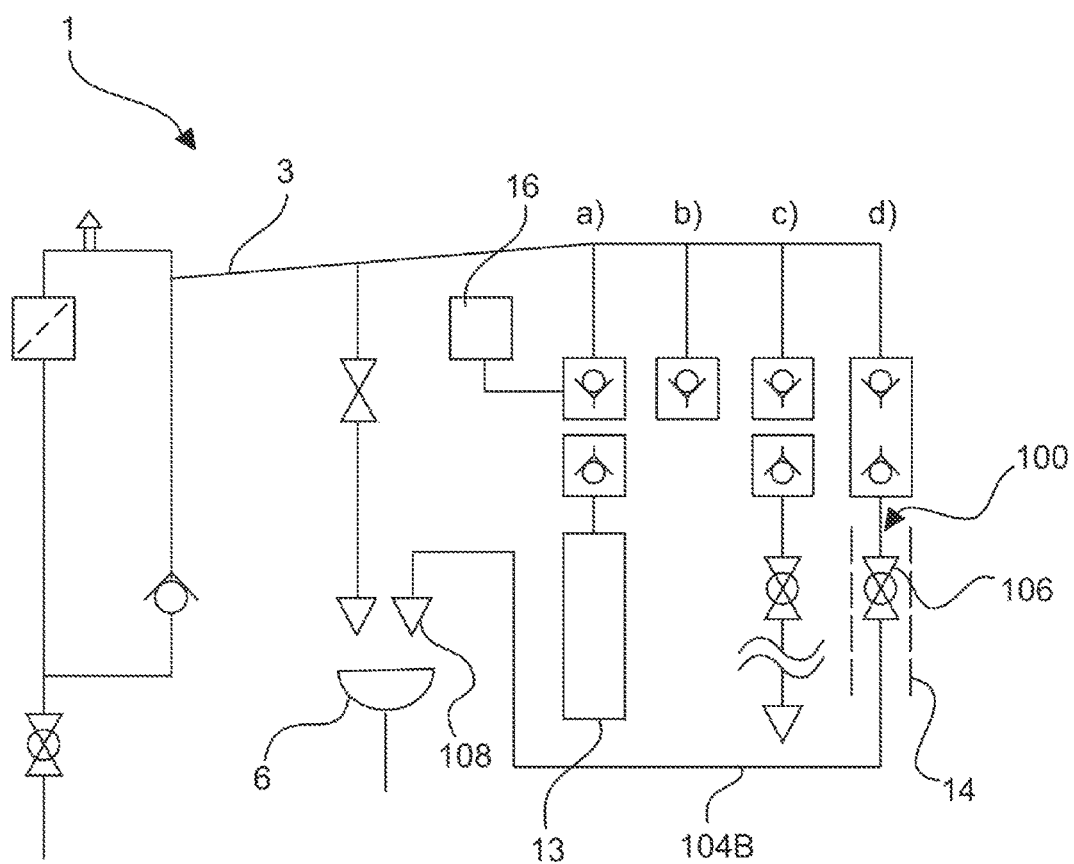
FIG. 4 shows a schematic representation of a galley unit.

FIG. 4 shows a galley unit 1, wherein different states a), b), c) and d) are illustrated on the four fluid branches. State a) shows a kitchen appliance 13 that is coupled to the fluid branch. This is the operational mode of the kitchen appliance 13. State b) shows the fluid branch after the kitchen appliance has been decoupled. States c) and d) show how a draining device 100 is coupled to the fluid branch in order to drain the line system of the galley unit. The second fluid line section 104B is realized flexibly and can be routed to a water outlet 6. The draining device 100 is fixed relative to the mount 14 and thereby also holds the self-closing coupling 102 stationary relative to the fluid branch such that a fluid-tight, fluid-conductive and non-locking connection exists between these two components.

The draining device 100 allows the complete removal of rinsing fluid from the fluid branches 12. This makes it possible, in particular, to prevent the inadvertent use of rinsing fluid in a kitchen appliance connected after the draining process. Furthermore, rinsing fluid is prevented from accumulating and depositing in the fluid branches and, for example, the risk of frost damages to the fluid branches due to freezing of accumulated rinsing fluid can be lowered.

As a supplement, it should be noted that "comprising" does not exclude any other elements or steps and that "a" or "an" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A draining device for draining a fluid line of a galley unit, the draining device comprising:
   a first coupling connectable to a second coupling, the second coupling being connected to an end of the fluid line of the galley unit, wherein the first coupling and second coupling are configured to produce a fluid conductive connection between the fluid line and the draining device;
   wherein the first and second coupling form a double self-closing coupling between the draining device and the fluid line without producing a direct mechanical fixation between the fluid line and the first coupling; and
   a holding device that holds the first coupling stationary relative to the fluid line such that no relative motion between the double self-closing coupling and the fluid line takes place;
   wherein the holding device comprises guide rails or holding rails that are designed for engaging with a mount of the galley unit for fixing the draining device relative to the mount;
   wherein the guide rails or holding rails extend in a direction parallel to the fluid line; and
   wherein the double self-closing coupling is configured to automatically separate and close the first and the second couplings if the first coupling is moved away from the second coupling without releasing a mechanical lock.

2. The draining device according to claim 1, wherein the holding device connects the first coupling to the fluid line in a fluid-tight manner.

3. The draining device according to claim 1, wherein the holding device is offset relative to the first coupling in the longitudinal direction of the drainage line.

4. The draining device according to claim 1, further comprising a valve, wherein the valve is arranged in a drainage line and allows the discharge of a fluid through the drainage line.

5. The draining device according to claim 4, wherein the drainage line is at least sectionally realized in the form of a flexible hose.

6. The draining device of claim 1, further comprising a drainage line, wherein the first coupling is arranged at an end of the drainage line, and wherein the holding device is coupled to the drainage line.

7. A galley unit for a means of transportation, comprising:
   a water supply having a supply line and a first fluid branch, wherein the first fluid branch is a consumer;
   a second coupling at an end of the first fluid branch;
   a draining device for draining a fluid line,
   wherein the draining device comprises:
   a first coupling connectable to a second coupling, wherein the first and second coupling are configured to produce a fluid-conductive connection between the first fluid branch and the draining device;
   wherein the first and second coupling form a double self-closing coupling between the draining device and the first fluid branch without producing a direct mechanical fixation between the first fluid branch and the first coupling; and
   a holding device that holds the first coupling stationary relative to the first fluid branch such that no relative motion between the first coupling and the fluid line takes place;
   wherein the holding device comprises guide rails or holding rails that are designed for engaging with a mount of the galley unit for fixing the draining device relative to the mount;
   wherein the guide rails or holding rails extend in a direction parallel to the fluid line;
   wherein the double self-closing coupling is configured to automatically separate and close the first and second coupling if the first coupling is moved away from the second coupling without releasing a mechanical lock; and
   wherein the first coupling is coupled to the second coupling in a fluid-conductive manner such that a fluid can be discharged from the first fluid branch.

8. The galley unit according to claim 7, further comprising a control unit, wherein the control unit transfers the first fluid branch into a fluid-conductive state by opening an outlet valve of the first fluid branch.

9. The galley unit according to claim 8, wherein the draining device comprises a drainage line and a drainage valve in the drainage line, and wherein the control unit places the drainage valve in the drainage line in a fluid-conductive state.

* * * * *